W. C. MARTINDALE.
Horse Hay-Rakes.
No. 140,634. Patented July 8, 1873.
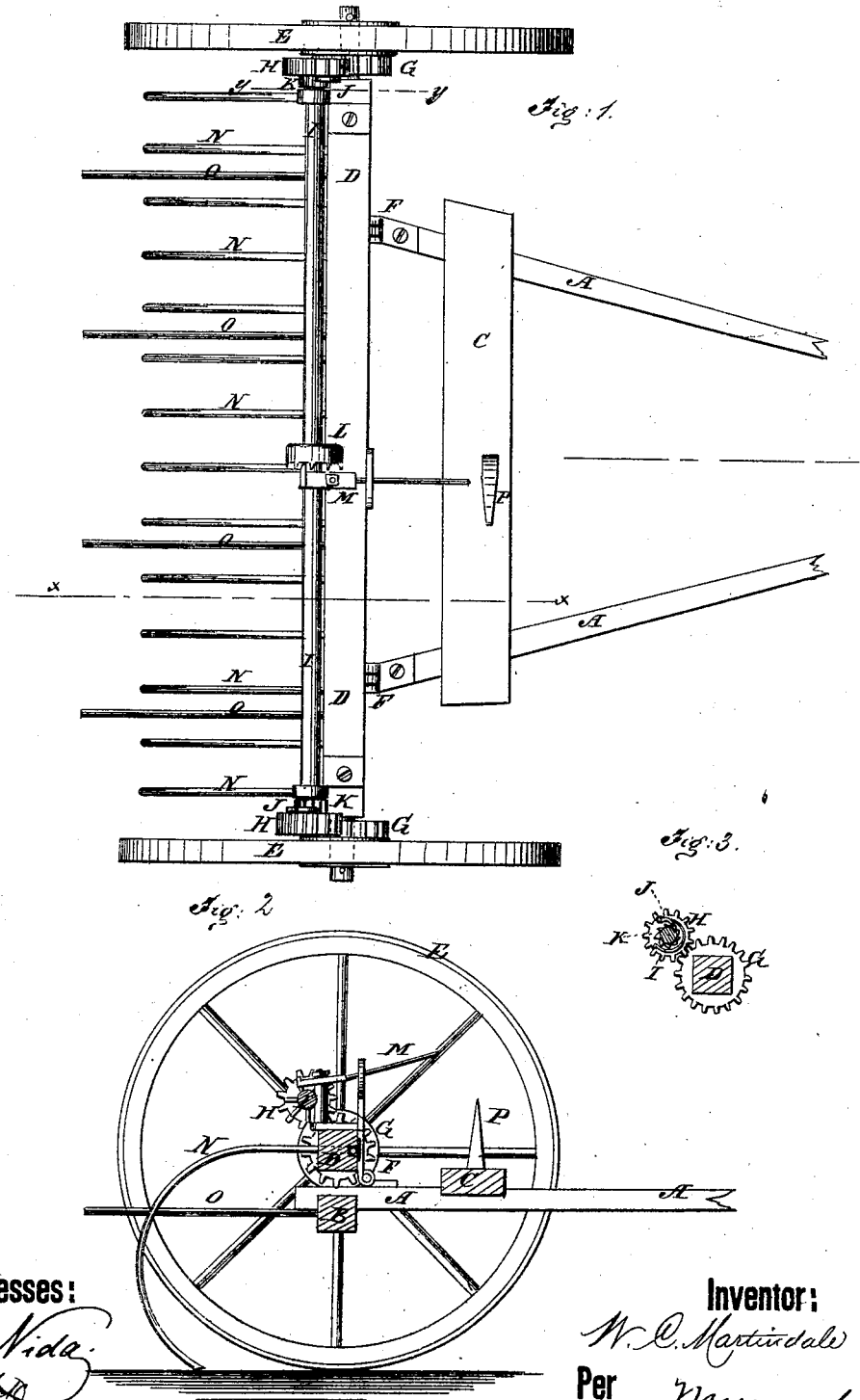

UNITED STATES PATENT OFFICE.

WATSON C. MARTINDALE, OF PHILADELPHIA, PENNSYLVANIA.

IMPROVEMENT IN HORSE HAY-RAKES.

Specification forming part of Letters Patent No. 140,634, dated July 8, 1873; application filed May 10, 1873.

*To all whom it may concern:*

Be it known that I, WATSON C. MARTINDALE, of Philadelphia, in the county of Philadelphia and State of Pennsylvania, have invented a new and useful Improvement in Horse Hay-Rake, of which the following is a specification:

Figure 1 is a top view of my improved horse hay-rake. Fig. 2 is a vertical cross-section of the same taken through the line $x$ $x$, Fig. 1. Fig. 3 is a detail cross-section of the rod and axle, showing the gearing.

Similar letters of reference indicate corresponding parts.

My invention has for its object to furnish an improved horse hay-rake, which shall be so constructed that the teeth may be raised to discharge the hay by the advance of the machine, and may be disengaged automatically and allowed to drop back to the ground when the hay has been discharged. The invention consists in the combination of the gear-wheels, the loose gear-wheels, the pawls and ratchet wheels, the rod, the ratchet-wheel, the lever-pawl, and the inclined arm, with the wheels, the hinged axle, the shafts, the curved teeth, and the straight teeth, as hereinafter fully described.

A are the shafts, which are connected at their rear ends by a cross-bar, B, and a little in front of their rear ends by a foot-board or bar, C. D is the axle, upon the journals of which the wheels E revolve, and which is connected with the shafts A by hinges F. To the inner ends of the hubs of the wheels E are attached small gear-wheels G, the teeth of which mesh into the teeth of smaller gear-wheels H, which run loosely upon the ends of the rod I, and which are made to carry said rod I with them in their revolutions by spring-pawl J, attached to them, and which take hold of the teeth of ratchet-wheels K, attached to said rod I. This construction causes both wheels E to act to revolve the rod I when the machine is drawn forward in a straight line, and at the same time allows one of the wheels E to turn slower than the other in turning or when the machine is drawn forward in a curved line. The rod I revolves in bearings attached to the axle D, and to its middle part is attached a ratchet-wheel, L. M is a lever-pawl, which is pivoted to a support attached to the axle D in such a position that the engaging end of the said lever-pawl may be brought into contact with the teeth of the ratchet-wheel L. N are the rake-teeth, which are curved in the ordinary manner, and are attached to the axle D. O are straight teeth, which are attached to the cross-bar B of the shafts A, and project to the rearward between the teeth N, so as when the teeth N are raised to discharge the collected hay the teeth O may prevent said hay from being carried up by and with said teeth O.

By this construction, as the machine is drawn forward, the rod I will be revolved. When a sufficient amount of hay has been collected the lever-pawl is thrown into gear with the ratchet-wheel L. This stops the revolution of the rod I, so that as the machine continues to advance the rod I and axle D are carried forward, which raises the teeth N and discharges the hay. As the rod I and axle D are carried forward the projecting end of the lever-pawl M strikes the inclined arm P, attached to the foot-board C, which disengages the pawl M from the ratchet-wheel L and allows the teeth N to drop back to the ground, ready to again collect the hay.

Having thus described my invention, I claim as new and desire to secure by Letters Patent—

The combination of the gear-wheels G, loose gear-wheels H, pawls and ratchet wheels J K, rod I, ratchet-wheel L, lever-pawl M, and inclined arm P, with the wheels E, hinged axle D, shafts A B C, curved teeth N, and straight teeth O, substantially as herein shown and described.

WATSON C. MARTINDALE.

Witnesses:
 WATSON COMLY,
 MARY L. COMLY.